March 22, 1932.         C. M. SIMMONS         1,850,359
SANITARY FAUCET PROTECTOR
Filed Dec. 17, 1929

INVENTOR.
CHARLES M SIMMONS
BY
A. B. Bowman
ATTORNEY

Patented Mar. 22, 1932

1,850,359

UNITED STATES PATENT OFFICE

CHARLES M. SIMMONS, OF SAN DIEGO, CALIFORNIA

SANITARY FAUCET PROTECTOR

Application filed December 17, 1929. Serial No. 414,676.

My invention relates to sanitary faucet protectors, and the objects of my invention are: First, to provide a cap for preventing dust or insects from entering the nozzle of a faucet; second, to provide a cap of this description which may be readily moved away from the nozzle when using the faucet, and which automatically assumes a position over the nozzle when released; third, to provide a faucet protector which may be readily attached to a faucet and adjusted angularly and in height relative to the nozzle to suit various conditions; fourth, to provide a faucet protector which will not readily corrode or deteriorate; fifth, to provide a faucet protector including an adapter for placing around the nozzle when necessary to provide a seat for the cap; sixth, to provide a faucet protector particularly adapted for use on fountain faucets used for the dispensing of syrups and the like; and seventh, to provide a faucet protector which is simple and economical of manufacture, and which will not readily deteriorate or get out of order.

Figure 1:
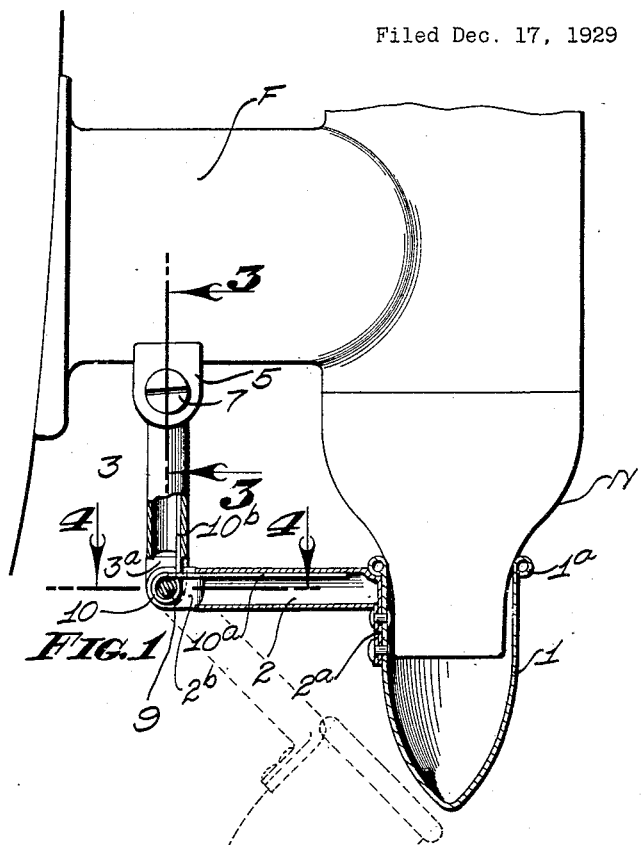
Figure 2:
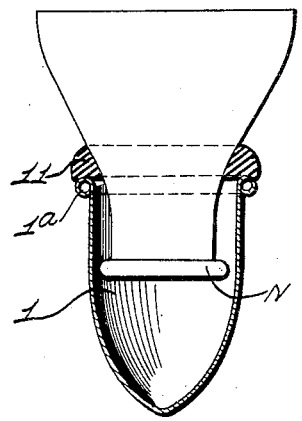
Figure 3:
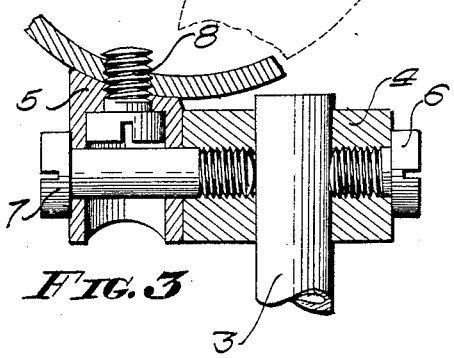
Figure 4:
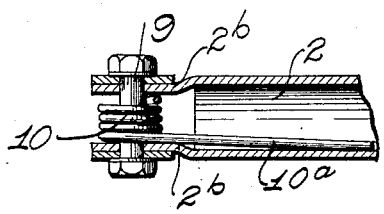

With these and other objects in view as will appear hereinafter, my invention consists of certain novel features of construction, combination and arrangement of parts and portions as will be hereinafter described in detail, and particularly set forth in the appended claims, reference being had to the accompanying drawings and to the characters of reference thereon which form a part of this application, in which:

Figure 1 is an elevational view of a faucet provided with my novel protector, portions of which are shown in section in order to facilitate the illustration; Fig. 2 is an end view of a faucet showing the protector cap positioned over the nozzle and an adapter for seating the same, the cap and adapter being shown in section; Fig. 3 is an enlarged, fragmentary view in section along the line 3—3 in Fig. 1; Fig. 4 is an enlarged, fragmentary view in section along line 4—4 in Fig. 1; and Fig. 5 is an enlarged, fragmentary view of a modified form of supporting member for the bracket, showing portions of the faucet in section.

Cap 1, stem 2, rod 3, hub 4, support 5, screws 6, 7 and 8, bolt 9, spring 10, and washer 11 form the principal parts and portions of the form of faucet protector illustrated in Figs. 1 to 4, inclusive.

Figure 5:
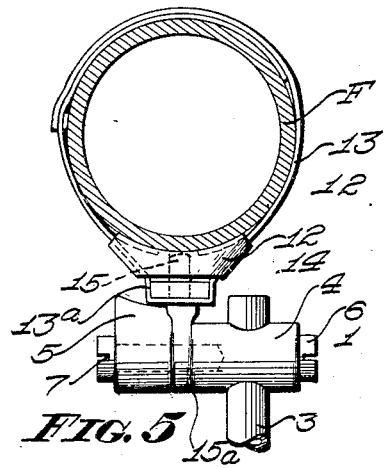

Guide member 12, strap 13, nut 14, and screw 15 form the principal parts and portions of my modified supporting means illustrated in Fig. 5.

The cap 1 is made preferably in the form of a hollow, bullet-shaped receptacle, the rim portion of which is beaded as at 1a in Figs. 1 and 2. The diameter of the cap at its upper portion is somewhat greater than that of the conventional facuet nozzle of the type used for the dispensing of syrup, root beer, and the like.

The cap 1 is preferably pressed in the form shown of a single piece of suitable non-corrosive metal. A laterally extending stem 2 is secured to the cap at its upper end by means of rivets or the like extending through the right-angularly bent end portion 2a of the stem 2. The stem 2 is preferably hollow and at its outer end is slightly flattened as at 2b in Fig. 4. The flattened portions are drilled to receive a bolt 9, which forms the pivotal joint of the stem 2 and rod 3.

The rod 3, which is also preferably hollow, passes through a circular hole extending through a hub member 4 transversely of the longitudinal axis thereof. The lower end of the rod 3 is bifurcated as at 3a and overlaps the flattened portion 2b of the stem 2. Holes in bifurcated portion 3a register with the holes in the stem 2, the bolt 9 passing through these holes for holding the stem 2 and rod 3 together.

A spring 10 forms a number of convolutions around the bolt 9 between the portions 2b of the stem 2. The end portion 10a of the spring 10 extends into the hollow stem, while the end portion 10b extends into the rod 3, as clearly shown in Figs. 1 and 4. The spring can thus draw the stem 2 and rod 3 toward each other so that when the rod 3 is held in a substantially vertical position, the cap 1 is drawn up against the nozzle N of the faucet F, the beaded rim 1a of the cap engaging the curved surface of the nozzle N.

The hub 4 is provided with a set screw 6 in one end adapted to engage the upper end of the rod 3, enabling the latter to be adjusted in height. Hub member 4 is secured to the support member 5 by means of a suitable screw 7 which extends into the opposite end of the hub 4. The support 5 is preferably a metallic block, and its upper surface is curved to correspond to the contour of the faucet F. A screw 8 entering a suitably tapped hole in the faucet F secures the supporting position.

It is obvious that the rod 3 need not be positioned exactly parallel with the axis of the nozzle N since the cap is angularly adjustable around the axis of the rod 3. The latter may be rotated to any position and fastened there by means of the screw 6. At the same time the hub 4 may be secured with the rod 3 at various angles relative to the support 5 by means of the screw 7. Thus the bracket formed by the members 2 and 3 may be adjusted so that the cap will occupy the correct position over the mouth of the nozzle. In case the nozzle is provided with a flange at its lower margin, as illustrated in Fig. 2, necessitating the use of a cap of considerably greater diameter than would otherwise be necessary, a suitable seating for the rim of the cap may be provided by means of a rubber washer 11 secured at the proper position around the nozzle.

In the modified form of support for the bracket, illustrated in Fig. 5, a screw 15 having a flattened eye head 15a is adapted to be positioned between the support member 5 and the hub 4. The screw 7 extending through the eye, not shown, into the eye head 15a and into the hub 4.

The screw 15 passes through a nut 14 supported in a rectangular cradle 13a formed by a strap 13. The strap 13 passes through the arms of a guide member 12, the upper surface of which forms a saddle for receiving the lower surface of the faucet F. The strap 13, which is made preferably of metal, is of conventional form, having spaced apart slots into which the hook end 13b may be inserted. The screw 15 serves to draw the strap 13 tight around the faucet F.

In operation, the cap is swung downwardly to the dotted position shown in Fig. 1, and is held thereby the hand grasping the glass held under the nozzle N, while with the other hand, the valve (not shown) of the faucet F is operated. After removing the glass, the cap 1 automatically springs back into the position shown in full lines in Figs. 1 and 2, thereby preventing entrance of dust, insects, or the like, and insuring absolutely sanitary conditions at all times.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. The combination with a fountain faucet, of a support secured thereto adjacent the nozzle thereof, bracket means adjustably connected to said support, a cap secured to said bracket, and resilient means carried by said bracket for moving said cap to a position over said nozzle.

2. In a fountain faucet protector, a cap adapted to extend over the nozzle of a faucet, a stem extending outwardly from said cap, a rod to which the outer end of said stem is hinged, means for adjustably supporting said rod on said faucet, and resilient means for holding said stem at an angle to said rod with said cap over said nozzle.

3. In a fountain faucet protector, a support rigidly securable to a faucet, a bracket adjustably secured to said support at one of its ends, and a cap supported at its other end, said bracket including a normally stationary member and a movable member pivotally connected to said stationary member, and a spring resiliently holding said pivoted member at an angle to said stationary member.

In testimony whereof, I have hereunto set my hand at San Diego, California, this 7th day of December, 1929.

CHARLES M. SIMMONS.